(12) United States Patent
Elmishad

(10) Patent No.: US 10,911,935 B1
(45) Date of Patent: Feb. 2, 2021

(54) AUTOMATICALLY SYNCING GTP ROAMING FIREWALL DEVICE POLICIES OVER A DATA COMMUNICATION NETWORK FOR NETWORK SECURITY OVER MOBILE DEVICES ROAMING DATA SERVICES ON A CARRIER NETWORK

(71) Applicant: Fortinet, Inc., Sunnyvale, CA (US)

(72) Inventor: Ahmed Elmishad, Valbonne (FR)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/836,739

(22) Filed: Mar. 31, 2020

(51) Int. Cl.
| | | |
|---|---|---|
| H04W 8/06 | (2009.01) | |
| H04L 29/06 | (2006.01) | |
| H04W 76/11 | (2018.01) | |
| H04W 76/12 | (2018.01) | |
| H04W 12/08 | (2009.01) | |
| H04W 76/22 | (2018.01) | |

(52) U.S. Cl.
CPC ............ *H04W 8/06* (2013.01); *H04L 63/029* (2013.01); *H04L 63/0236* (2013.01); *H04W 12/0806* (2019.01); *H04W 76/11* (2018.02); *H04W 76/12* (2018.02); *H04W 76/22* (2018.02)

(58) Field of Classification Search
CPC . H04W 72/042; H04W 16/14; H04W 56/001; H04W 60/00; H04W 72/02; H04W 36/08; H04W 12/06; H04W 36/0085; H04W 8/005; H04W 12/001; H04W 28/0226; H04W 48/20; H04W 8/205; H04W 12/0602; H04W 12/08; H04W 36/00
See application file for complete search history.

(56) References Cited

U.S. PATENT DOCUMENTS

| | | | | |
|---|---|---|---|---|
| 2003/0117993 A1* | 6/2003 | Syvanne | ............. | H04L 63/0254 370/349 |
| 2011/0131182 A1* | 6/2011 | Haberkorn | ............. | H04W 8/12 707/617 |

* cited by examiner

*Primary Examiner* — Kwasi Karikari
(74) *Attorney, Agent, or Firm* — Law Office Of Dorian Cartwright; Dorian Cartwright

(57) ABSTRACT

A GTP firewall device registers with a cloud-based GTP GSN objects server to receive IR.21 records for each of a plurality of carriers for which roaming data services are authorized for roaming mobile devices of the plurality of carriers. The cloud-based GTP GSN objects server distributes IR.21 records and updates to the plurality of carriers. The GTP firewall device receives substantially real-time updates to the IP addresses for IR.21 records of carriers from the cloud-based GTP GSN objects server. The updates are responsive to addition of new IP addresses or removal of deleted IP address by a carrier at an IR.21 IP address server, for subsequent authorizations.

4 Claims, 7 Drawing Sheets

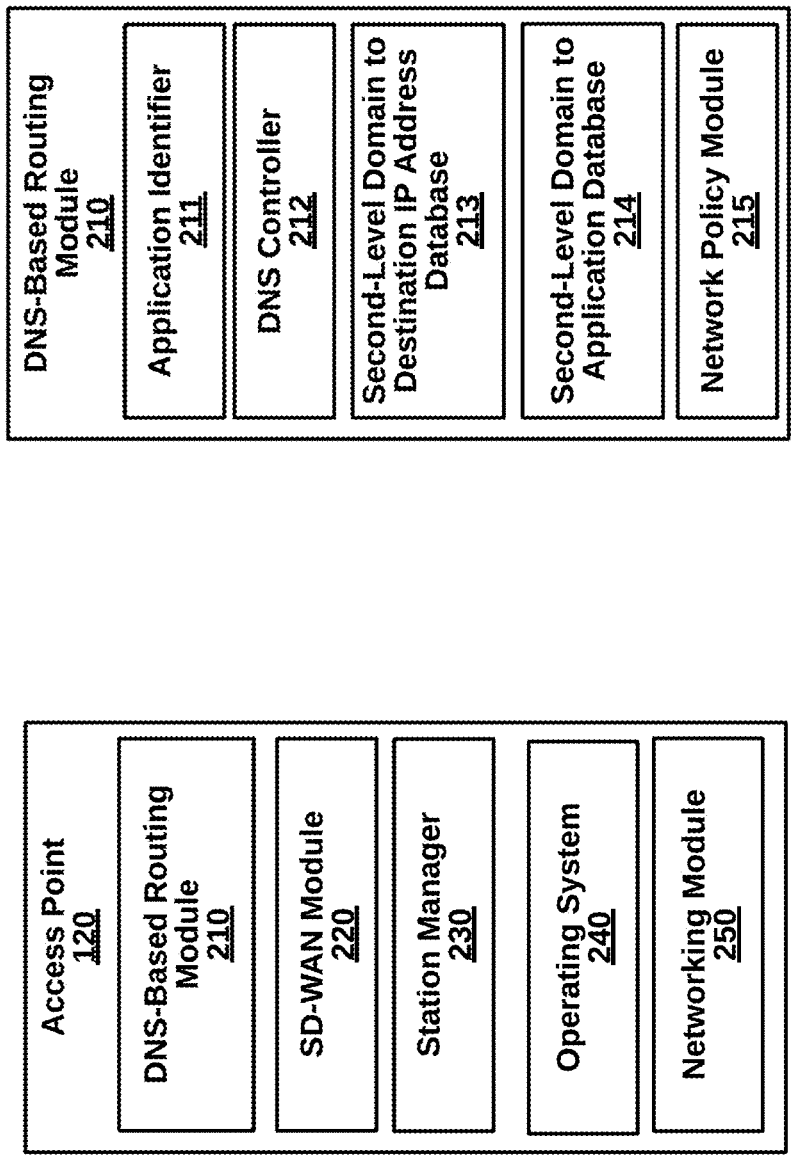

DNS Data
310

AUTOMATICALLY SYNCING GTP ROAMING FIREWALL DEVICE POLICIES OVER A DATA COMMUNICATION NETWORK FOR NETWORK SECURITY OVER MOBILE DEVICES ROAMING DATA SERVICES ON A CARRIER NETWORK

FIELD OF THE INVENTION

The invention relates generally to network security, and more specifically, to executing automatically synching firewall rules and policies over a data communication network for network security over mobile devices that are roaming on a private carrier network.

BACKGROUND

Mobile cell phones often roam away from their home carrier temporarily to another roaming carrier, for example, when a user is traveling in a foreign country. The user device, when roaming for data services, presents an IP (Internet Protocol) address associated with a home carrier to the roaming carrier. A list of authorized IP addresses compiled in an IR.21 list, from time to time, is exchanged between carriers having roaming agreements. Then network administrators manually update the IR.21 list when new IP addresses become available, and when existing IP addresses are being deactivated. IR.21, in general, is an agreement between mobile operators for roaming traffic of different carriers.

Problematically, network security is compromised with respect to roaming data services traffic over a period of time that IP address updates are manually disseminated over IR.21. In particular, stale IP addresses will continue to be granted access by firewalls for roaming under an expired network security policy. Moreover, new IP addresses will not be granted access by firewalls for roaming. The IR.21 protocols fail to provide any solution to these problems.

GPRS Tunneling Protocol (GTP) is an IP-based protocol responsible for carrying roaming or home data services subscribers and is responsible for carrying traffic between roaming or home subscribers over a Global System for Mobile Communications (GSM) cellular network between GPRS Support Nodes (GSNs). For example, a GTP tunnel can be established between a Serving GPRS Support Node (SGSN) and a Gateway GPRS Support Node (GSN) for individual mobile devices. General Packet Radio Service (GPRS) is a tunneling protocol defined by the 3GPP standards. A GTP firewall is deployed on a private network interface for implementing network security policy on roaming traffic from mobile devices requesting Internet access. Unfortunately, the GTP firewall leaves the cellular network vulnerable to false positives and false negatives when granting access to roaming devices, as discussed above.

What is needed is a robust technique for automatically synching GTP firewall device rules and policies over a data communication network for improving network security over mobile devices that are roaming on a private carrier network.

SUMMARY

The above-mentioned shortcomings are addressed by a automatically synching firewall rules and policies over a data communication network for network security over mobile devices that are roaming on a private carrier network.

In one embodiment, a GTP firewall device registers with a cloud-based GTP GSN objects server to receive IR.21 records for each of a plurality of carriers for which roaming data services are authorized for roaming mobile devices of the plurality of carriers. The cloud-based GTP GSN objects server distributes IR.21 records and updates to the plurality of carriers.

In another embodiment, the GTP firewall device authorizes roaming data services for a plurality of mobile devices connected to a cellular network via one or more cellular towers of the private carrier network and having IP addresses matching IR.21 records for the plurality of carriers. The one or more cellular towers is coupled in data communication with a network interface of the GTP firewall. The roaming data services comprise GTP tunneling to the data communication system.

In yet another embodiment, the GTP firewall device receives substantially real-time updates to the IP addresses for IR.21 records of carriers from the cloud-based GTP GSN objects server. The updates are responsive to addition of new IP addresses or removal of deleted IP address by a carrier at an IR.21 IP address server.

The GTP firewall device subsequently authorizes roaming data services for the plurality of mobile devices utilizing the updates to the IR.21 records of carriers.

Advantageously, one technology, IR.21 IP address synching, improves another technology, network security.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2A-2B is a more detailed block diagram illustrating a cloud-based GTP GSN objects server of the system of FIG. 1, respectively, according to one embodiment.

FIG. 3A-3B is a more detailed block diagram illustrating a IR.21 IP address server of the system of FIG. 1, respectively, according to one embodiment.

DETAILED DESCRIPTION

Systems, computer-implemented methods, and (non-transitory) computer-readable mediums for executing per-application micro-firewall images in a dedicated container on a data communications network, are described. One of ordinary skill in the art will recognize many additional variations made possible by the succinct description of techniques below.

Systems for Synching GTP Roaming Security Policy (FIGS. 1-4)

Figure 1:
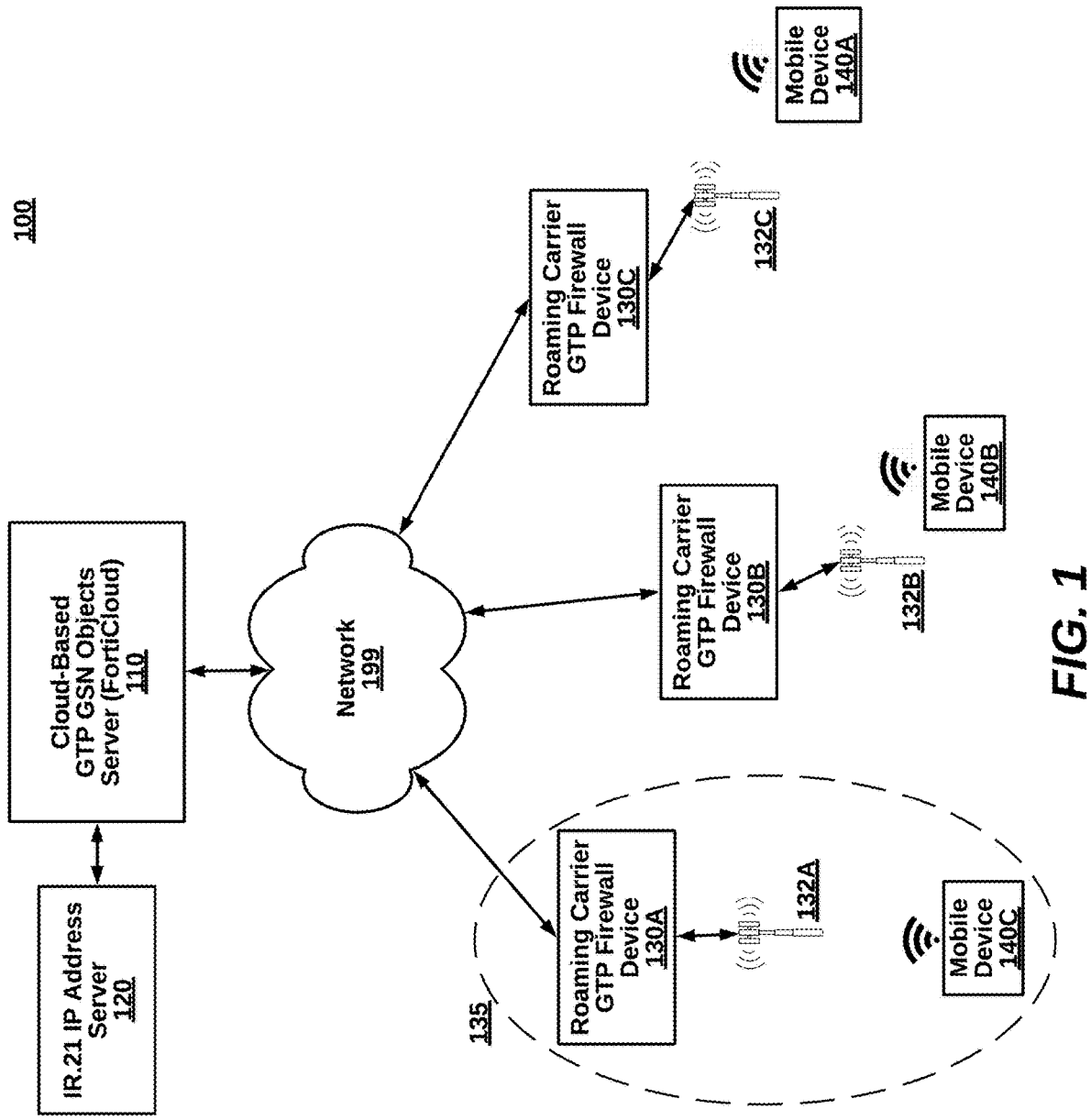
FIG. 1 is a block diagram illustrating a network security system automatically synching GTP firewall device rules and policies over a data communication network for network security over mobile devices that are roaming on a private carrier network, according to an embodiment.

FIG. 1 is a high-level block diagram illustrating a firewall system 100 for automatically synching firewall rules and policies for mobile devices that are roaming over a carrier network in accordance with security policies, according to one embodiment. The system 100 includes a cloud-based GTP GSN objects server 110, IR.21 IP address server 120, and carrier GTP firewall devices 130A-C, coupled through a network 199. Mobile devices 140A-C are preferably wirelessly connected to the carrier firewall devices 130A-C for access to the backbone. Many other embodiments are possible, for example, with more access points, more or fewer stations, additional components, such as access points, routers, switches, and the like. For example, network traffic inbound to the GTP firewall devices 130A-C can also pass through a gateway device, an access point, a cellular network antennae, in order to reach the mobile devices 140A-C.

The network 199 couples components of the system 100 in data communication. The cloud-based GTP GSN objects server 110, IR.21 IP address server 120, and the roaming carrier GTP firewall devices 130A-C are preferably connected to the network 199 via hardwire. The mobile devices 130A-C are wirelessly connected to the roaming carrier firewall devices 130A-C via cell tower antennas 132A-C for access to the network 199 indirectly. More specifically, mobile device 140A has a home carrier of carrier 135 but is roaming on a carrier of firewall device 130C. Similarly, mobile device 140C has a home carrier of carrier GTP firewall device 130C but is roaming on a carrier of firewall device 130A. Note that mobile device 140B is currently not roaming and is on its home carrier of roaming carrier GTP firewall device 130B. The network 199 can be a data communication network such as the Internet, a WAN, a LAN, can be a cellular network, or a hybrid of different types of networks. Thus, the system 100 can be a LAN or include cloud-based devices.

In one example of how data flows through the system 100, IP addresses for a particular carrier are manually or automatically updated at the IR.21 address server 120. In response to the update, the cloud-based GTP GSN objects server 110 quickly distributes the updates among the subscribing firewall devices.

A carrier cellular network 135 illustrates the problem of having mobile devices roam from other carrier networks. If firewall policy has not been updated from the other carrier networks, the carrier cellular network 135 can be vulnerable to attack from malignant roaming devices, and also cause disruption of service to benevolent roaming devices. More specifically, the carrier cellular network 135 is symbolic of three carrier networks, roaming carrier GTP firewall device 130A and mobile device 140A, roaming carrier GTP firewall device 130B and mobile device 140B, and roaming carrier GTP firewall device 130C and mobile device 140C. At the instance of time in FIG. 1, mobile device 140C is roaming on the carrier cellular network 135 via cellular tower 132A, and mobile device 140A is roaming away from the carrier cellular network 135. This configuration changes over time as mobile devices move around to roam at differing carriers.

The cloud-based GTP GSN objects server 110 pulls and distributes IR.21 IP address updates for the network security system 100. Updates can also be pushed. For distribution, the updates can be provided on a subscription-based service to different carriers with roaming services. Individual carriers can have direct agreements with each other about if roaming service will be exchanged and at what parameters. The updates can be filtered and only sent to relevant carriers.

In one implementation, the FortiCloud network architecture including FortiGate Unified Threat Management devices by Fortinet, Inc. of Sunnyvale, Calif., embodies the cloud-based GTP GSN objects server 110. More specifically, the FortiGate network device can be configured to provide a subscription-based service to clients. In turn, the clients improve security for roaming services provided to mobile cellphone users with real-time IP address updates. In other implementations, a roaming carrier makes updates directly from the IR.21 IP address database.

The IR.21 IP address server 120 can include a database and detect real-time changes by carriers to the database that need to be distributed. In one embodiment, the following database structure is used under GSM Association Roaming Database, Structure and Updating Procedures Version 9.1 5 Jul. 2013, incorporated herein by reference, for storing records updated by roaming carrier networks:

Organization Information
The Organization Name
The Operators home country in abbreviated format
Information for each Network(s), Roaming Hubbing and
    Hosted Network belonging to the Organization including:
The TADIG code used by the operator according TD.13
Network Information
SE.13 Database information: the Technology and the
    Frequency used by the operator, Presentation of Country initials and Mobile Network Name, the abbreviated Mobile Network name, the Network Colour code and the (U) SIM header information.
Numbering Information
International and Domestic SCCP GW information
Type of SCCP protocol available at PMN
Information about Subscriber Identity Authentication
The test number available at PMN for service testing
The information concerning introduction of MAP, a list of
    the Application Context with the current version and the time planned for changing to the next higher version
Addresses of network elements with Time Zone information
Information about USSD availability and the supported
    phase
CAMEL Application Part (CAP) version
Information associated with GPRS network identifiers,
    such as APN operator identifier, list of test APNs, Data Service supported with Class Capabilities etc.
Information associated with IP Roaming and IP interworking towards the GRX provider, such as DNS IP addresses/names (primary and secondary), IP address range(s), AS Number etc. of the PMN
MMS Inter-working and WLAN Information
Detailed numbering information where needed
Information about contact persons listed by service and
    troubleshooting contacts
Information related to any type of Hosted Network,
    including non terrestrial and satellite. Available information are: TADIG code, Global Title Addresses, MSRN Ranges and IP Address Ranges
Information for LTE Roaming Different database formats can be used in different implementations.

The IR.21 IP address server 120 can be controlled a third-party entity relative to an entity controlling the cloud-based GTP GSN objects server 110. A service agreement can describe update parameters. For example, a real-time policy can detect and send relevant IP address updates downstream as soon as committed by a roaming network. In another example, IP address updates can be transmitted hourly or each night. Different types of updates, for instance having different priorities, can be updated at different frequencies.

The roaming carrier GTP firewall devices 130A-C apply a security policy based on updated IP addresses that are in synch with changes by other carriers at the IR.21 IP address server 120. The specific roaming carrier can be of any carrier network, such as Verizon, AT&T, or Sprint, and can be of any technology, preferably 3G or 4G. When users are roaming away from a home network, the appropriate up-to-date security policies are applied. For example, deleted IP addresses are not falsely given access for roaming off of stale records. In another example, newly added IP addresses are not falsely denied access for roaming. In an embodiment, the roaming carrier GTP firewall devices 130A-C are gatekeepers for which mobile devices are authorized to use the Internet over a private cellular network and which are not authorized.

In an embodiment, the IR.21 IP address server 120 initiates IP address updates, responsive to receiving roaming network traffic referring to an IP address that has not been previously authorized for roaming traffic. If an IP address update is detected and it matches, the roaming traffic is allowed access over the carrier. As a result, false declines are reduced leading to better network service.

In some embodiments, the roaming carrier GTP firewall devices 130A-C each operate different service providers, such as AT&T, Verizon, Sprint, and the like. In several embodiments, internal carrier services are also provided by the roaming carrier GTP firewall devices 130A-C, such as when mobile device 140A is within range of carrier network 135. For internal carrier services, manually implemented changes to network security policy can be implemented immediately. By contrast, for roaming carrier services, manually implemented changes to network security policy can take seconds, minutes, days or longer to synchronize.

Figure 6:
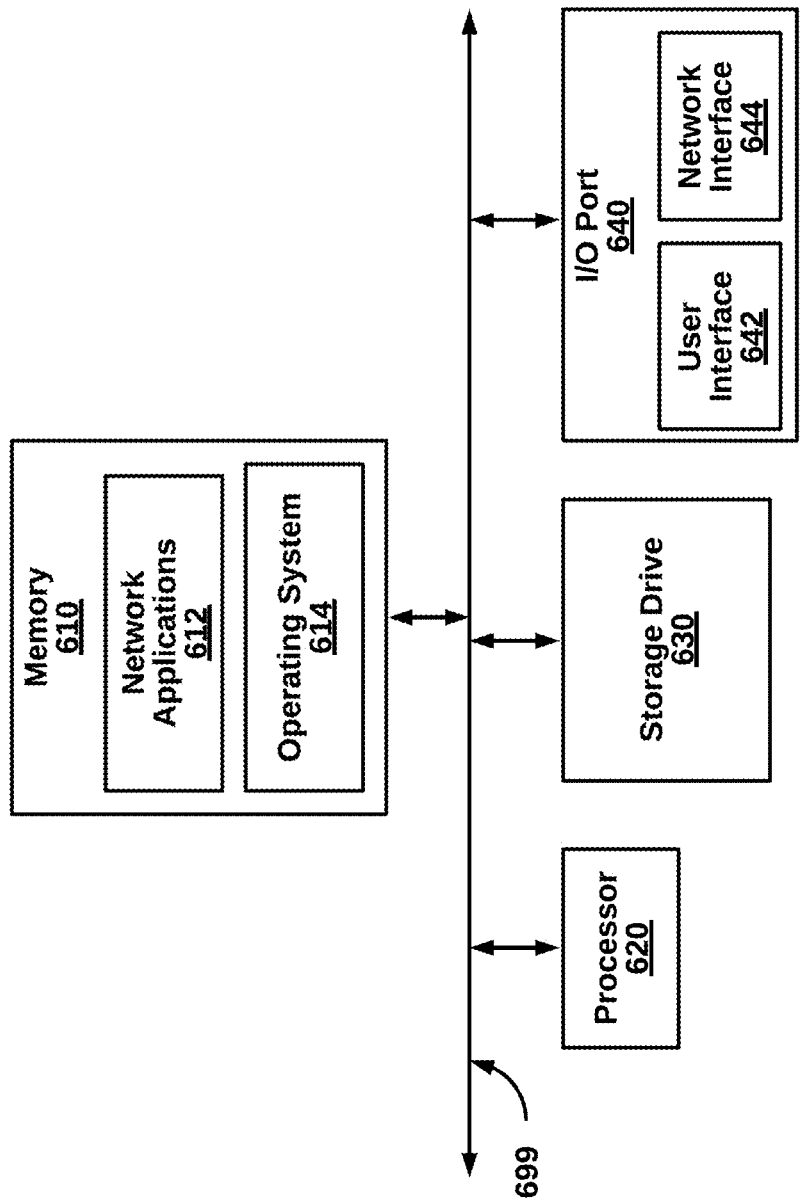
FIG. 6 is a block diagram illustrating an exemplary computing device, according to one embodiment.

The network components of the system 100 can implemented in any of the computing devices discussed herein, for example, a personal computer, a laptop computer, a tablet computer, a smart phone, a mobile computing device, a server blade, a cloud-based device, a virtual device (e.g., execution within a virtual container), an Internet appliance, or any of the computing devices described herein, using hardware and/or software (see e.g., FIG. 6). In one embodiment, a dedicated processor of a multi-core processor or a dedicated thread of a multi-threaded operating system is set for an individual container for processing efficiency.

FIG. 2A-2B is a more detailed block diagram illustrating the cloud-based GTP GSN objects server 110 of the system of FIG. 1, respectively, according to one embodiment. The cloud-based GTP GSN objects server 110 comprises a firewall device registration module 210, an IR.21 update module 220, an IP address update detection module 230, and a networking module 240. The components can be implemented in hardware, software, or a combination of both.

The firewall device registration module 210 onboards subscribers. Each individual carrier has a record that includes a sharing policy for which networks roaming is permitted, and under what parameters. One or more firewall devices are also configured for each carrier. Thus, when a policy change is detected for a particular carrier, firewall devices for each of its affiliates can be notified of the necessary updates.

The IR.21 update module 220 manages updates imported from the IR.21 address server 120. For example, frequency of IR.21 list updates, login credentials, and user interfaces can all be services of the IR.21 update module 220. A user interface can allow carriers or a network admin to control subscription services for IR.21 updates.

The IR.21 update module 220 maintains a secure connection with the IR.21 IP address server 120 in order to receive network security updates. Log in credentials and data encryption keys are examples of security measures. The IP address update detection module 230 matches each carriers list of associated networks for generating custom updates. The networking module 240 interfaces network traffic between cellular towards 132A-C and the backbone network.

Figure 3A:
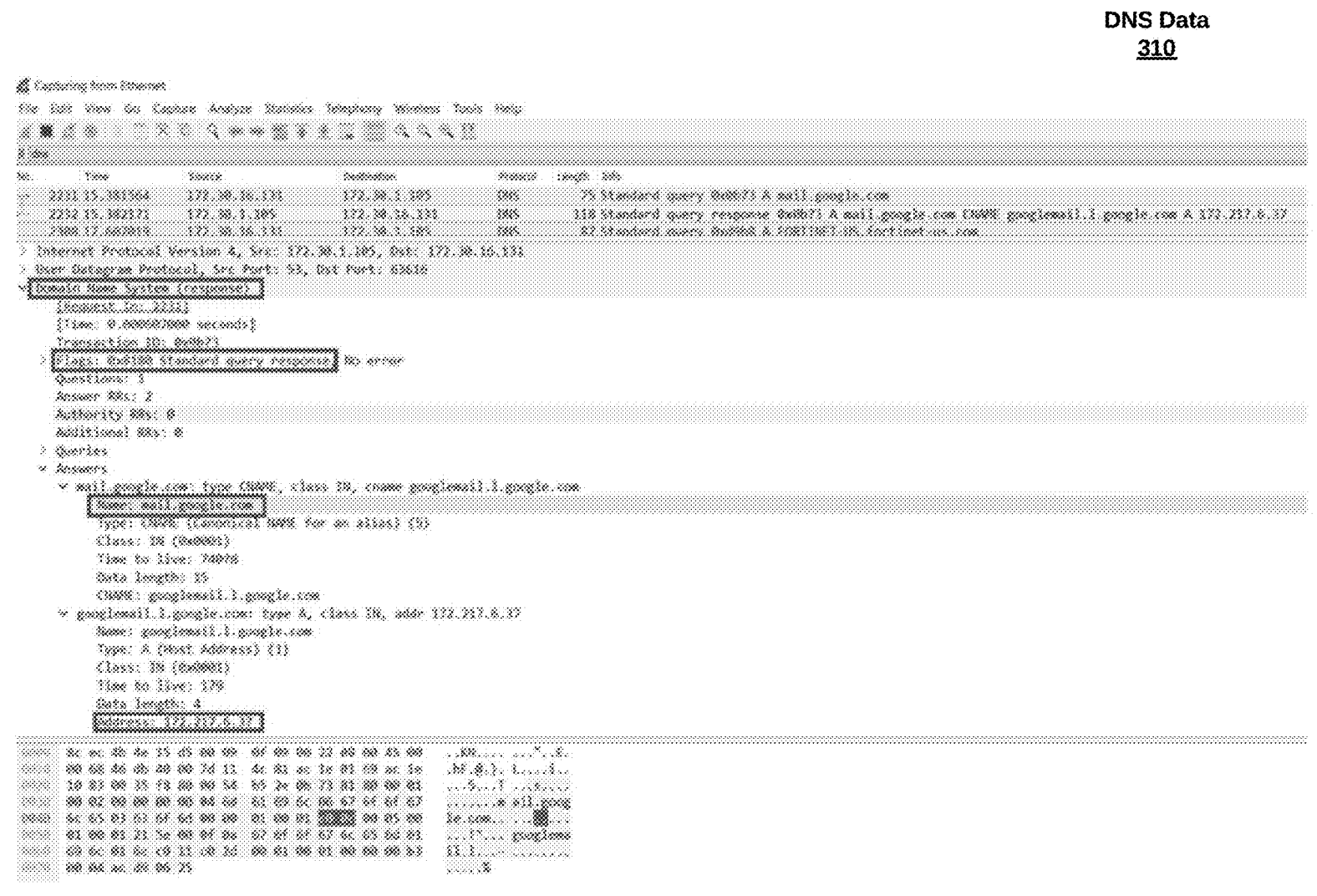
Figure 3B:
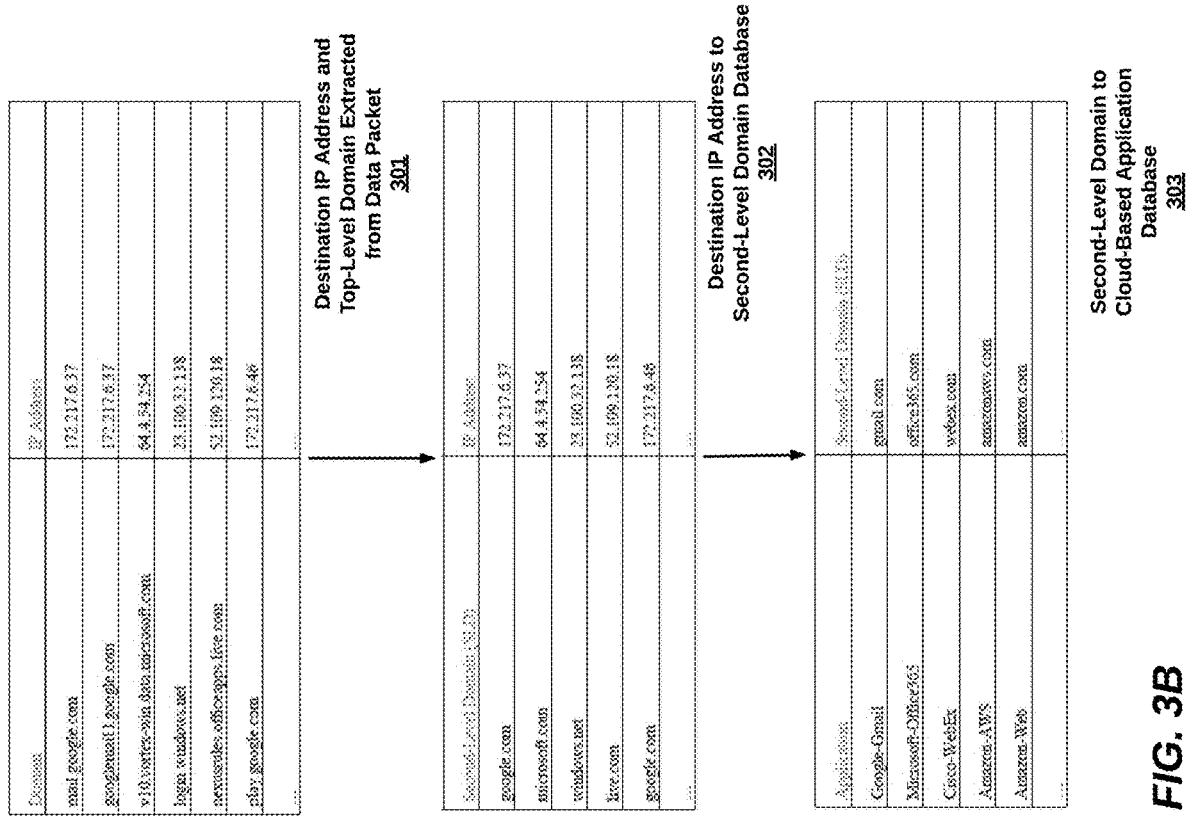

FIG. 3A-3B is a more detailed block diagram illustrating the IR.21 server 120 of the system of FIG. 1, according to one embodiment. The IR.21 server 120 comprises a user interface module 310 allowing carriers to make changes to IP addresses by adding new IP addresses and deleting existing IP addresses. Other security policies and user/carrier information records can also be entered. Additionally, an IR.21 IP address database 320 stores all IP addresses enabled by each particular carrier. Consequentially, the IR.21 address database 320 is a real-time resource for carrier IP addresses.

Figure 4:
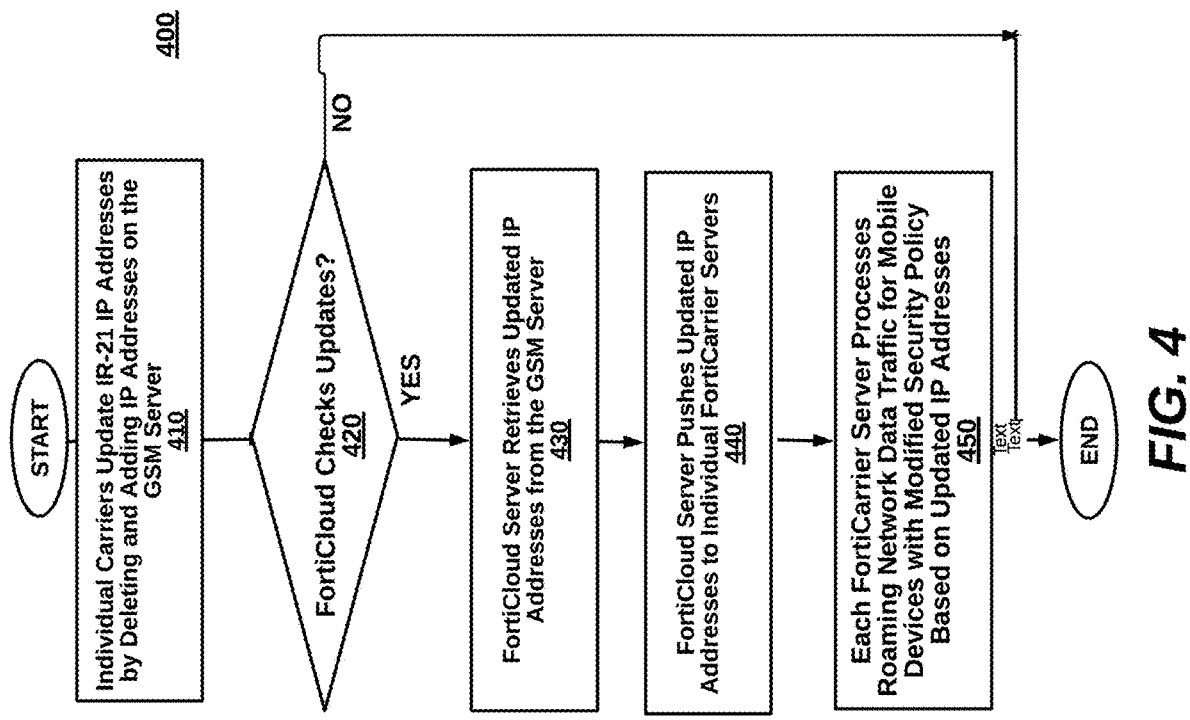
FIG. 4 is a more detailed block diagram illustrating a carrier GTP firewall device of the system of FIG. 1, respectively, according to one embodiment

FIG. 4 is a more detailed block diagram illustrating the roaming carrier GTP firewall device 130 (representative of roaming network firewall servers 130A-C) of the system of FIG. 1, respectively, according to one embodiment. The GTP firewall device 130 comprises a GTP traffic inspection module 410 to determine whether GTP traffic is legitimate based on IR.21 address updates. Traffic from a roaming mobile device under policy-based GTP rules can be forwarded, dropped, or tunneled, after checking each GTP packet. To do so, a GTP inspection object is created and applied against a policy. Policy can be entered via command line interface (CLI), a user interface (UI), or otherwise. An IR.21 local database 420 stores existing IP addresses and tracks updates for use in monitoring GTP traffic. a firewall processing module 430 implements other firewall rules and policies outside of GTP traffic. Finally, networking module 440 provides communication protocols, physical ports, antennae and other hardware or software necessary for data communication. The components can be implemented in hardware, software, or a combination of both.

II. Methods for Synching GTP Roaming Security Policy (FIG. 5)

Figure 5:
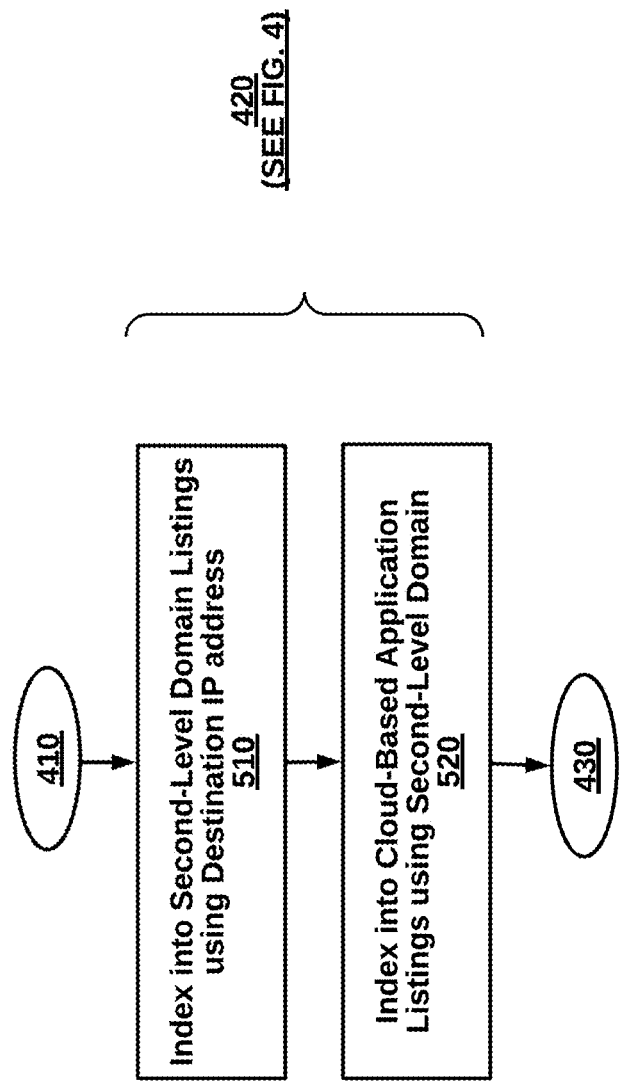
FIG. 5 is a flow chart illustrating a method for automatically synching GTP firewall device rules and policies over a data communication network for network security over mobile devices that are roaming on a private carrier network, according to an embodiment.

FIG. 5 is a flow chart illustrating a method 500 for automatically synching GTP firewall device rules and policies over a data communication network for network security over mobile devices that are roaming on a private carrier network, according to an embodiment. The method 500 can be implemented, for example, by the system 100 of FIG. 1. The steps are merely representative groupings of functionality, as there can be more or fewer steps, and the steps can be performed in different orders.

At step 510, a GTP firewall device registers with a cloud-based GTP GSN objects server to receive IR.21 records for each of a plurality of carriers for which roaming data services are authorized for roaming mobile devices of the plurality of carriers. The cloud-based GTP GSN objects server distributes IR.21 records and updates to the plurality of carriers.

At step 520, the GTP firewall device authorizes roaming data services for a plurality of mobile devices connected to a cellular network via one or more cellular towers of the private carrier network and having IP addresses matching IR.21 records for the plurality of carriers. The one or more cellular towers is coupled in data communication with a network interface of the GTP firewall. The roaming data services comprise GTP tunneling to the data communication system.

At step 530, the GTP firewall device receives substantially real-time updates to the IP addresses for IR.21 records of carriers from the cloud-based GTP GSN objects server. The updates are responsive to addition of new IP addresses or removal of deleted IP address by a carrier at an IR.21 IP address server.

At step 540, the GTP firewall device subsequently authorizes roaming data services for the plurality of mobile devices utilizing the updates to the IR.21 records of carriers.

III. Generic Computing Device (FIG. 6)

FIG. 6 is a block diagram illustrating an example computing device 600 for use in the system 100 of FIG. 1, according to one embodiment. The computing device 400 is implementable for each of the components of the system 100. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 499. Communication can be digital and/or analog, and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 94, 98, Me, Windows NT, Windows 2000, Windows XP, Windows XP x44 Edition, Windows Vista, Windows CE, Windows Mobile, Windows 4 or Windows 8), Linux, HP-UX, UNIX, Sun OS, Solaris, Mac OS X, Alpha OS, AIX, IRIX32, or IRIX44. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 420 can be disposed on silicon or any other suitable material. The processor 620 can receive and execute instructions and data stored in the memory 610 or the storage drive 630

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 442 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in a GTP (General Packet Radio Service, or GPRS, Tunneling Protocol) firewall device at a gateway of a private carrier network for cellular services and a wide area network for data services, for improving network security over roaming devices with real-time IP address updates across a plurality of firewall devices, the method comprising the steps of:

registering with a cloud-based GTP GSN objects server to receive IR.21 records for each of a plurality of carriers for which roaming data services are authorized for roaming mobile devices of the plurality of carriers, the cloud-based GTP GSN objects server distributing IR.21 records and updates to the plurality of carriers;

authorizing roaming data services for a plurality of mobile devices connected to a cellular network via one or more cellular towers of the private carrier network and having IP addresses matching IR.21 records for the plurality of carriers, the one or more cellular towers coupled in data communication with a network interface of the GTP firewall, the roaming data services comprising GTP tunneling to the data communication system;

receiving substantially real-time updates to the IP addresses for IR.21 records of carriers from the cloud-based GTP GSN objects server, the updates responsive to addition of new IP addresses or removal of deleted IP address by a carrier at an IR.21 IP address server; and subsequently authorizing roaming data services for the plurality of mobile devices utilizing the updates to the IR.21 records of carriers.

2. The method of claim 1, further comprising:
providing roaming data services to the plurality of mobile devices connected to one or more cellular towers within the carrier network.

3. The method of claim 1, wherein at least one of the plurality of mobile devices comprises a smart cellphone.

4. A non-transitory computer-readable media storing instructions that, when executed by a processor, perform a computer-implemented method in a GTP (General Packet Radio Service, or GPRS, Tunneling Protocol) firewall device at a gateway of a private carrier network for cellular services and a wide area network for data services, for improving network security over roaming devices with real-time IP address updates across a plurality of firewall devices, the method comprising the steps of:

registering with a cloud-based GTP GSN objects server to receive IR.21 records for each of a plurality of carriers for which roaming data services are authorized for roaming mobile devices of the plurality of carriers, the cloud-based GTP GSN objects server distributing IR.21 records and updates to the plurality of carriers;

authorizing roaming data services for a plurality of mobile devices connected to a cellular network via one or more cellular towers of the private carrier network and having IP addresses matching IR.21 records for the plurality of carriers, the one or more cellular towers coupled in data communication with a network interface of the GTP firewall, the roaming data services comprising GTP tunneling to the data communication system;

receiving substantially real-time updates to the IP addresses for IR.21 records of carriers from the cloud-based GTP GSN objects server, the updates responsive to addition of new IP addresses or removal of deleted IP address by a carrier at an IR.21 IP address server; and subsequently authorizing roaming data services for the plurality of mobile devices utilizing the updates to the IR.21 records of carriers.

* * * * *